(12) United States Patent
Zhang et al.

(10) Patent No.: US 10,176,323 B2
(45) Date of Patent: Jan. 8, 2019

(54) METHOD, APPARATUS AND TERMINAL FOR DETECTING A MALWARE FILE

(71) Applicant: iYuntian Co., Ltd., Beijing (CN)

(72) Inventors: Zhuang Zhang, Beijing (CN); Changkun Zhao, Beijing (CN); Liang Cao, Beijing (CN); Zhiqiang Dong, Beijing (CN)

(73) Assignee: IYUNTIAN CO., LTD., Beijing (CN)

( * ) Notice: Subject to any disclaimer, the term of this patent is extended or adjusted under 35 U.S.C. 154(b) by 130 days.

(21) Appl. No.: 14/985,944

(22) Filed: Dec. 31, 2015

(65) Prior Publication Data
US 2017/0004306 A1    Jan. 5, 2017

(30) Foreign Application Priority Data
Jun. 30, 2015   (CN) .......................... 2015 1 0377521

(51) Int. Cl.
| | | |
|---|---|---|
| H04L 29/06 | (2006.01) | |
| G06F 21/56 | (2013.01) | |
| G06N 99/00 | (2010.01) | |

(52) U.S. Cl.
CPC ............ *G06F 21/562* (2013.01); *G06F 21/56* (2013.01); *G06N 99/005* (2013.01); *H04L 63/1416* (2013.01)

(58) Field of Classification Search
CPC ..... G06F 21/562; G06F 21/56; G06N 99/005; H04L 63/1408
(Continued)

(56) References Cited

U.S. PATENT DOCUMENTS

| 6,578,018 B1 * | 6/2003 | Ulyanov ................ B82Y 10/00 706/14 |
| 6,775,405 B1 * | 8/2004 | Zhu ...................... G06K 9/6212 345/419 |

(Continued)

FOREIGN PATENT DOCUMENTS

| CN | 02708313 A | 10/2012 |
| CN | 102708313 A | * 10/2012 |

(Continued)

OTHER PUBLICATIONS

Shafiq, "Improving Accuracy of Immune-inspired Malware Detectors by using Intelligent Features", GECCO'08, Jul. 12-16, 2008. pp. 119-126.*

(Continued)

*Primary Examiner* — Luu T Pham
*Assistant Examiner* — Walter J Malinowski
(74) *Attorney, Agent, or Firm* — Lathrop Gage LLP

(57) ABSTRACT

The present application discloses a method, an apparatus and a terminal for detecting a malware file. One embodiment of the method comprises: obtaining a file to be inspected; determining an entropy vector of the file; and inspecting the entropy vector of the file using a trained inspection model to determine if the file is a malware file, wherein a file type of the file is identical to the file type corresponding to the inspection model. This embodiment extracts the entropy vector of the file and determines if the file is a malware file based on the entropy vector of the file. Therefore, the technical problems existed in the art, such as a low speed, a poor capacity and a low efficiency of detecting and destroying the malware file, are addressed and the efficiency of detecting and destroying the malware file is enhanced.

5 Claims, 3 Drawing Sheets

(58) Field of Classification Search
USPC .................................................. 726/22–24
See application file for complete search history.

(56) References Cited

U.S. PATENT DOCUMENTS

| | | | |
|---|---|---|---|
| 7,376,635 B1* | 5/2008 | Porcari | G06F 17/279 |
| 7,593,904 B1* | 9/2009 | Kirshenbaum | G06N 99/005 |
| | | | 706/12 |
| 8,176,414 B1* | 5/2012 | Baluja | G06F 17/30905 |
| | | | 715/234 |
| 8,266,698 B1* | 9/2012 | Seshardi | G06F 21/53 |
| | | | 726/22 |
| 8,402,543 B1* | 3/2013 | Ranjan | H04L 63/1416 |
| | | | 709/223 |
| 8,744,171 B1* | 6/2014 | Smith | G06K 9/00429 |
| | | | 382/159 |
| 9,288,220 B2* | 3/2016 | Raugas | H04L 63/1408 |
| 9,465,940 B1* | 10/2016 | Wojnowicz | G06F 21/565 |
| 9,465,942 B1* | 10/2016 | Kane-Parry | |
| 9,483,742 B1* | 11/2016 | Ahmed | G06N 99/005 |
| 9,548,987 B1* | 1/2017 | Poole | H04L 63/1408 |
| 9,607,272 B1* | 3/2017 | Yu | G06N 99/005 |
| 9,665,713 B2* | 5/2017 | Avasarala | G06F 21/56 |
| 2007/0294768 A1* | 12/2007 | Moskovitch | G06F 21/566 |
| | | | 726/24 |
| 2009/0094697 A1* | 4/2009 | Provos | G06F 21/577 |
| | | | 726/23 |
| 2009/0113128 A1* | 4/2009 | Zhao | G06F 21/56 |
| | | | 711/115 |
| 2010/0153785 A1* | 6/2010 | Keromytis | G06F 11/08 |
| | | | 714/38.11 |
| 2010/0205198 A1* | 8/2010 | Mishne | G06F 17/30864 |
| | | | 707/759 |
| 2012/0078825 A1* | 3/2012 | Kulkarni | G06F 17/30864 |
| | | | 706/12 |
| 2012/0084859 A1* | 4/2012 | Radinsky | G06F 21/56 |
| | | | 726/23 |
| 2012/0158626 A1* | 6/2012 | Zhu | G06F 21/56 |
| | | | 706/13 |
| 2013/0018650 A1* | 1/2013 | Moore | G06F 17/2818 |
| | | | 704/9 |
| 2013/0067579 A1* | 3/2013 | Beveridge | G06F 21/56 |
| | | | 726/24 |
| 2013/0097704 A1* | 4/2013 | Gavrilut | G06F 21/56 |
| | | | 726/23 |
| 2013/0104230 A1* | 4/2013 | Tang | G06F 21/552 |
| | | | 726/23 |
| 2013/0218815 A1* | 8/2013 | Nugent | G06N 5/025 |
| | | | 706/12 |
| 2013/0243192 A1* | 9/2013 | de Roulet | G06F 7/00 |
| | | | 380/46 |
| 2013/0291108 A1* | 10/2013 | Yu | G06F 21/55 |
| | | | 726/23 |
| 2013/0291111 A1* | 10/2013 | Zhou | G06F 21/566 |
| | | | 726/23 |
| 2014/0337257 A1* | 11/2014 | Chatterjee | G06N 99/005 |
| | | | 706/12 |
| 2015/0172300 A1* | 6/2015 | Cochenour | H04L 63/145 |
| | | | 726/23 |
| 2015/0310295 A1* | 10/2015 | Wang | G06T 5/001 |
| | | | 382/197 |
| 2016/0044059 A1* | 2/2016 | Fine | H04L 63/1416 |
| | | | 726/23 |
| 2016/0055044 A1* | 2/2016 | Kawai | G06N 99/005 |
| | | | 714/26 |
| 2016/0103932 A1* | 4/2016 | Sathish | G06F 17/30705 |
| | | | 715/767 |
| 2016/0213353 A1* | 7/2016 | Masui | A61B 8/461 |
| 2016/0307113 A1* | 10/2016 | Calapodescu | G06N 99/005 |
| 2016/0335425 A1* | 11/2016 | Liu | G06F 21/31 |
| 2016/0366158 A1* | 12/2016 | Feng | H04L 63/1416 |
| 2017/0193230 A1* | 7/2017 | Jevnisek | G06F 21/564 |

FOREIGN PATENT DOCUMENTS

| | | | | | |
|---|---|---|---|---|---|
| CN | 103839006 | A | * | 6/2014 | |
| CN | 103839006 | A | | 6/2014 | |
| JP | 2003207565 | A | * | 7/2003 | |
| JP | 2009301557 | A | * | 12/2009 | |
| JP | 2013103072 | A | * | 5/2013 | |
| KR | 20070095718 | A | * | 10/2007 | G06F 21/552 |
| KR | 10-1432429 | B1 | | 8/2014 | |
| KR | 101432429 | B1 | * | 8/2014 | |
| KR | 20160119295 | A | * | 10/2016 | |

OTHER PUBLICATIONS

Han, "Distributed Malware Detection based on Binary File Features in Cloud Computing Environment", 2014 26th Chinese Control and Decision Conference (CCDC), IEEE, 2014, pp. 4083-4088.*

Chunyan, Wang, and Wei Ning. "Analysis of Project Cost Control Based on Information Entropy and Gray Correlation." (2014). (Year: 2014).*

Ali, Muhammad Qasim, Ehab Al-Shaer, Hassan Khan, and Syed Ali Khayam. "Automated anomaly detector adaptation using adaptive threshold tuning." ACM Transactions on Information and System Security (TISSEC) 15, No. 4 (2013): 17. (Year: 2013).*

Mekky, Hesham, Aziz Mohaisen, and Zhi-Li Zhang. "Separation of benign and malicious network events for accurate malware family classification." In Communications and Network Security (CNS), 2015 IEEE Conference on, pp. 125-133. IEEE, 2015. (Year: 2015).*

Chinese Patent Application No. 201510377521.3, Second Office Action dated Aug. 11, 2017 (including English translation).

* cited by examiner

METHOD, APPARATUS AND TERMINAL FOR DETECTING A MALWARE FILE

RELATED APPLICATION

The present application claims priority and benefits of Chinese patent application No. 201510377521.3 filed on Jun. 30, 2015, which is incorporated herein by reference in its entirety.

TECHNICAL FIELD

The present application relates to the technical field of computer technology, particularly, to the technical field of software fault detection, and more particularly, to a method, apparatus and terminal for detecting a malware file.

BACKGROUND

The continuous development of the computer technology has led to the widespread use of computers in daily life at the present time. The computer, with its ever increasing functionalities, has become an indispensable tool for one's leisure and work. However, sophisticated attack techniques have been utilized by individuals and organizations to persistently attack particular targets over networks. The attack may execute malicious codes and lead to the disclosure of sensitive information, and threaten the network security.

There are two existing methods for detecting a malware file, a static detection method and a dynamic detection method. The static detection method is used more often, and includes two approaches: detecting an abnormal file a) through a file type abnormality, and b) through characteristics associated with a software fault utilizing file. The dynamic detection method is a heuristic detection method. A file is executed under a more advanced heuristic condition in a simulated environment to detect behaviors not associated with a regular file. If the file triggers a shellcode (filled data belonging to a bug code), it will show behaviors that cannot be contributed to the file, for example, a network connection, a program execution, or a process injection.

However, the static detection method can easily be bypassed by constructing the file structure and modifying the shellcode. Therefore, the static detection method has a dismal ability to heuristically detect and destroy malware files, and is incapable of detecting and destroying newly emerged malware files. For the dynamic detection method, there are various ways of detecting the virtual dynamic execution environment to not trigger relevant viral codes, leading to the failure in detection. Therefore, although the dynamic detection method has limited heuristic ability, the efficiency and the detection speed are relatively low and the heuristic ability is not as high as desired.

SUMMARY

The present application provides a method, an apparatus, and a terminal for detecting a malware file to solve the existing technical problems having a low detecting and destroying speed, a poor ability and a low efficiency of detecting and destroying the malware file.

In a first aspect, the present application provides a method for detecting a malware file. The method comprises: acquiring a file to be inspected; determining an entropy vector of the file; and inspecting, using a trained inspection model, the determined entropy vector of the file to ascertain whether the file is a malware file, wherein a file type of the file is identical to a model file type corresponding to the inspection model.

In some embodiments, the inspection model is obtained by: acquiring a plurality of files with an identical file type and known security categories as training files, wherein the security categories include malware file categories and non-malware file categories; labeling the acquired training files with security category labels according to the known security categories; determining the entropy vectors of the training files; and training and outputting an inspection model based on the determined entropy vectors and the security category labels of the training files.

In some embodiments, the inspection model is trained and output by: obtaining an initial inspection model based on the entropy vectors and the security category labels of the training files; determining if a misjudgment rate of the initial inspection model is below a predetermined threshold value; if the misjudgment rate is not below the predetermined threshold value, repeating a step of correcting the present inspection model and a step of determining if the misjudgment rate of the corrected inspection model is below the predetermined threshold value; and stopping the repeating and outputting the corrected inspection model when the misjudgment rate of the corrected inspection model is below the predetermined threshold value.

In some embodiments, the initial inspection model is obtained by: obtaining a subset of files from the training files as first files; performing a feature classification to the entropy vectors of the first files resulting in a classification outcome; and obtaining the initial inspection model by a learning operation based on the classification outcome and the security category labels of the first files.

In some embodiments, the determining if the misjudgment rate of the inspection model is below the predetermined threshold value comprises: obtaining a subset of files from the training files as second files; inspecting entropy vectors of the second files using an inspection model to be tested; determining the misjudgment rate based on inspected entropy vectors and the security category labels of the second files; and comparing the determined misjudgment rate with the predetermined threshold value to determine if the misjudgment rate is below the predetermined threshold value, wherein the second files and the first files are mutually exclusive.

In some embodiments, the present inspection model is corrected by at least one of: increasing a number of the first files and obtaining the inspection model by a further learning operation; and adjusting a dimension of the entropy vectors, and obtaining the inspection model by a further learning operation.

In some embodiments, the entropy vector of the file is determined by: dividing the file into a predetermined number of segments; obtaining an entropy value of each of the segments; and setting the number of the segments as a dimension of the entropy vector, wherein each of the segments corresponds to one direction of the entropy vector, and the entropy vector of the file is determined based on the entropy value of each of the segments.

In a second aspect, the present application provides an apparatus for detecting a malware file. The apparatus comprises: an acquisition unit acquiring a file to be detected; a determining unit determining an entropy vector of the file; and an inspection unit inspecting, using a trained inspection model, the determined entropy vector of the file to ascertain whether the file is a malware file, wherein a file type of the file is identical to a model file type corresponding to the inspection model.

In some embodiments, the inspection model is obtained by: acquiring a plurality of files with an identical file type and known security categories as training files, wherein the security categories comprise malware file categories and non-malware file categories; labeling the acquired training files with security category labels according to the known security categories; determining the entropy vectors of the training files; and training and outputting an inspection model based on the determined entropy vectors and the security category labels of the training files.

In some embodiments, the inspection model is trained and output by: obtaining an initial inspection model based on the entropy vectors and the security category labels of the training files; determining if a misjudgment rate of the initial inspection model is below a predetermined threshold value; if the misjudgment rate is not below the predetermined threshold value, repeating a step of correcting the present inspection model and a step of determining if the misjudgment rate of the corrected inspection model is below the predetermined threshold value; and stopping the repeating and outputting the corrected inspection model when the misjudgment rate of the corrected inspection model is below the predetermined threshold value.

In some embodiments, the initial inspection model is obtained by: obtaining a subset of files from the training files as first files; performing a feature classification to the entropy vectors of the first files to result in a classification outcome; and obtaining the initial inspection model by a learning operation based on the classification outcome and the security category labels of the first files.

In some embodiments, determining if the misjudgment rate of the inspection model is below the predetermined threshold value comprises: obtaining a subset of files from the training files as second files; inspecting entropy vectors of the second files using an inspection model to be tested; determining the misjudgment rate based on the inspected entropy vectors and the security category labels of the second files; and comparing the determined misjudgment rate with the predetermined threshold value to determine if the misjudgment rate is below the predetermined threshold value, wherein the second files and the first files are mutually exclusive.

In some embodiments, the present inspection model is corrected by at least one of: increasing a number of the first files and obtaining the inspection model by a further learning operation; and adjusting a dimension of the entropy vectors, and obtaining the inspection model by a further learning operation.

In some embodiments, the determining unit is configured to: divide the file into a predetermined number of segments; obtain an entropy value for each of the segments; and set the number of the segments as a dimension of the entropy vector, wherein each of the segments corresponds to one direction of the entropy vector and the entropy vector of the file is determined based on the entropy value of each of the segments.

In a third aspect, the present application provides a terminal comprising a processor and a memory, wherein the memory stores a trained inspection model, and the processor acquires a file to be inspected, determines an entropy vector of the file, and inspects, based on a trained inspection model, the determined entropy vector of the file to ascertain whether the file is a malware file, wherein a file type of the file is identical to a model file type corresponding to the inspection model.

In a fourth aspect, the present application provides a computer storage medium storing computer-readable instructions, wherein, when the computer-readable instructions are executed by a processor, the processor is operable to: obtain a file to be inspected, determine an entropy vector of the file; and inspect, using a trained inspection model, the determined entropy vector of the file to ascertain whether the file is a malware file, wherein a file type of the file is identical to a model file type corresponding to the inspection model.

In some embodiments, the inspection model is obtained by: acquiring a plurality of files with an identical file type and known security categories as training files, wherein the security categories include malware file categories and non-malware file categories; labeling the acquired training files with security category labels according to the known security categories; determining the entropy vectors of the training files; and training and outputting a inspection model based on the determined entropy vectors and the security category labels of the training files.

In some embodiments, the entropy vector of the file to be detected is extracted and it is determined if the file is a malware file based on the entropy vector of the file. Therefore, the technical problems existing in the art, such as low speed, poor capacity and a low efficiency of detecting and destroying the malware file, are solved and the efficiency of detecting and destroying the malware file is increased.

BRIEF DESCRIPTION OF THE DRAWINGS

Other features, objectives and advantages of the present application will be more apparent by reference to a detailed description of the non-limiting embodiments set forth below in conjunction with the accompanying drawings, wherein.

DETAILED DESCRIPTION

Hereinafter, the present application will be further explained in detail with reference to the accompanying drawings and embodiments. It should be understood that specific embodiments described herein intend to explain the relevant invention, rather than to limit the invention. In addition, it should be noted that only portions related to the present invention are shown in the accompanying drawings for the ease of description.

It should be noted that, the embodiments of the present application and the features thereof may be combined with each other unless there is a conflict. The present application will be described in detail through the embodiments with reference to the drawings.

The terminal related to the present application may comprise, but is not limited to, a smart phone, a tablet computer, a personal digital assistant, a laptop computer, and a desktop computer. The exemplary embodiments of the present application will be described in conjunction with a desktop computer hereinafter, for purpose of exemplary illustration and conciseness.

Figure 1:
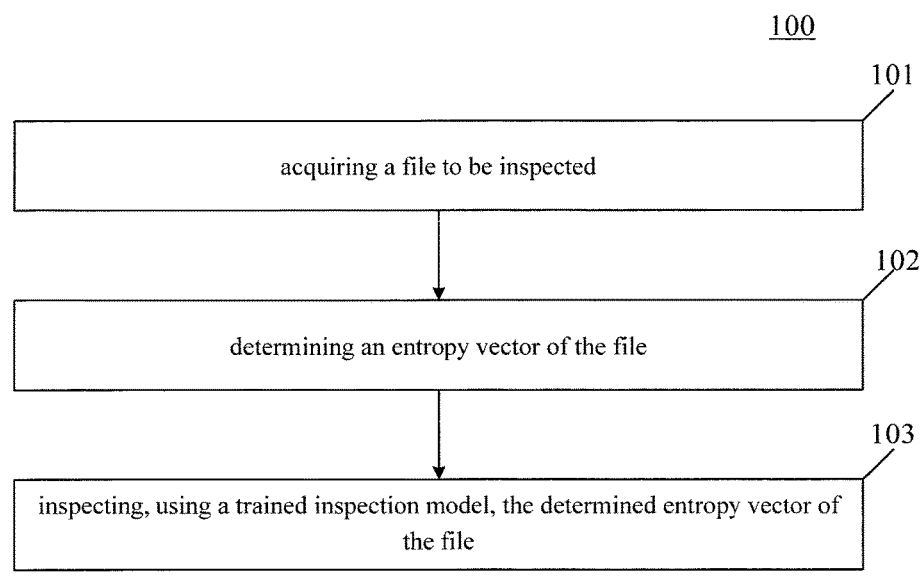
FIG. 1 is a flow chart of a method for detecting a malware file according to an embodiment of the present application.

Referring to FIG. 1, there is shown a flow chart 100 of a method for detecting a malware file according to an embodiment of the present application.

As shown in FIG. 1, a file to be inspected is acquired at step 101.

An entropy vector of the file is subsequently determined at step 102.

Generally, numerous repeated strings are structured in a malware file, whereupon a Return-oriented Programming (ROP) is structured to perform the codes in other modules, thereby bypassing the Data Execution Prevention (DEP) to release viruses.

In one embodiment, after thoroughly analyzing malware files, it is discovered that virus files are encrypted and placed after the file text in a suspiciously structured file. As a result, the entropy value of this section is inevitably high. In addition, since this section is filled with massive repeated data, a sudden uprush at the end of the file entropy curve is expected.

Figure 2:
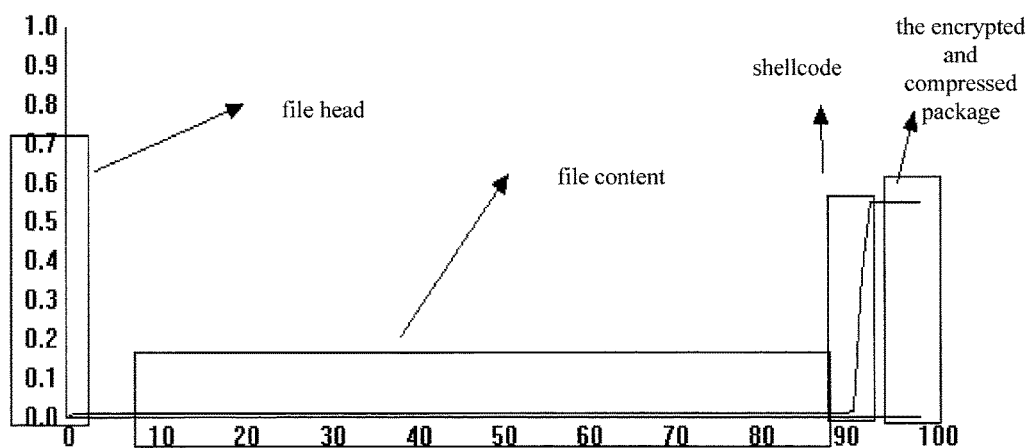
FIG. 2 is a schematic diagram illustrating the change in the entropy value curve of the malware file contents according to an embodiment of the present application.

As an example, FIG. 2 illustrates a schematic diagram of the change in the entropy value curve of the malware file content. As shown in FIG. 2, the horizontal coordinate represents the location of the file content fragment, and the origin of the horizontal coordinate represents the file head location. Increasingly larger horizontal coordinate values indicate the locations of the content fragments are increasingly closer to the file end. The vertical coordinate represents the entropy value of the content fragment corresponding to the horizontal coordinate. As can be observed in FIG. 2, there is a sudden uprush in the entropy value of the content fragment at the end of the malware file content.

Figure 3:
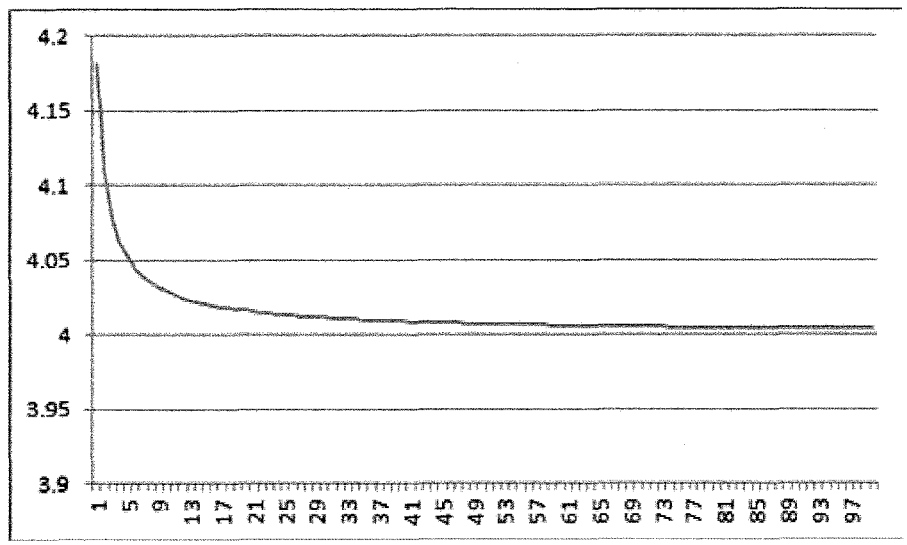
FIG. 3 is a schematic diagram illustrating the change in the entropy value curve of the file contents comprising a shellcode according to an embodiment of the present application.

As another example, FIG. 3 illustrates a schematic diagram of the change in the entropy value curve of the content in a shellcode containing file. As shown in FIG. 3, the horizontal coordinate represents the location of the file content fragment. The origin of the horizontal coordinate represents the file head location. A larger horizontal coordinate value indicates the location of the content fragment is closer to the file end. The vertical coordinate represents the entropy value of the content fragment corresponding to the horizontal coordinate. As can be observed in FIG. 3, the entropy value of the file content having a shellcode contains a widely-ranged continuous data around the value of 4.

Therefore, according to this embodiment, a file under testing may be ascertained whether the file is a malware file based on the feature of the entropy vector of the file.

It should be noted that, the entropy value of a file fragment represents the chaotic degree of that file fragment. The entropy values of texts, graphs, codes, compressed packages, applications, etc. are different due to their different organization modes. For example, a graph after compression and a compressed package will have high entropy values, and there are certain regularities. The state of the encoding may be represented by the information entropy of the encoded data.

In one embodiment, the entropy vector of the file may be determined using the following method. The file is first divided into a predetermined number of equal segments, and then the information entropy of each segment is calculated, to represent the coding variation of the entire file. The predetermined number may be a value preset by the user. It will be understood that the value of the predetermined number is not limited in the present application. The number of segments is set as the dimensions of the entropy vector, and each segment corresponds to one direction of an entropy vector. The entropy vector of the file is determined based on the entropy value of each segment. For example, assuming the file is equally divided into 3 segments, namely, segment i, segment j, and segment k. The entropy values of the 3 segments are a, b, and c, respectively. Hence the entropy vector of the file is a three-dimensional vector, which may be denoted as $\vec{s} = a\vec{i} + b\vec{j} + c\vec{k}$.

At last, at step 103, the entropy vector of the file is inspected by using a trained inspection model to determine whether the file is a malware file.

In one embodiment, a trained inspection model may be used to inspect the entropy vector of the file, analyze the feature of the entropy vector of the inspected file, and ascertain if the file is a malware file according to the feature of the entropy vector.

It should be noted that, the features of the entropy vector of the malware file are different for malware files with different file types. Therefore, each file type corresponds to a respective inspection model. When inspecting a file, the file type corresponding to the selected inspection model is identical to the file type of the file to be inspected.

According to the method provided by the above embodiments of the present application, the entropy vector of the to-be-inspected file is extracted. Based on the entropy vector of the file, it is ascertained whether the file is a malware file. Therefore, the technical problems existed in the prior art, such as low speed, poor capacity and low efficiency of detecting and destroying the malware file, are addressed and the efficiency of detecting and destroying the malware file is increased.

Figure 4:
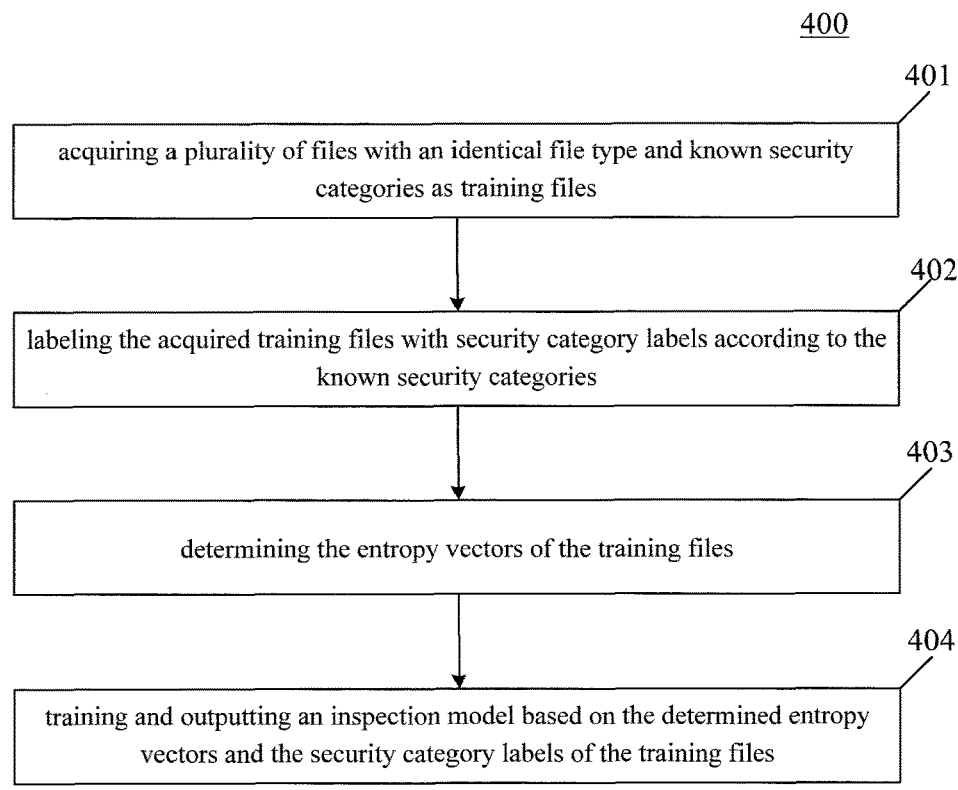
FIG. 4 is a flow chart of a method for obtaining an inspection model according to an embodiment of the present application.

Further referring to FIG. 4, there is shown a flow chart 400 of a method for obtaining an inspection model.

As shown in FIG. 4, at step 401, a plurality of files with an identical file type and known security categories are acquired as training files.

In one embodiment, the plurality of files with the identical file type may be randomly acquired as training files, and the security categories of these files are known, where the security categories include malware file categories and non-malware file categories. It should be noted that, the security category of the training files mentioned above may be determined by other means than those disclosed herein. It should also be understood that the present application does not limit the particular method to determine the security category.

Subsequently at step 402, the training files mentioned above are labeled according to the security categories.

In one embodiment, the above mentioned training files are labeled according to the security category. In one implementation of this embodiment, the training files may be labeled with security categories using particular colors, wherein different colors represent different security categories. In another implementation of this embodiment, the training files may be labeled with security categories using particular symbols, wherein different symbols represent different security categories. It will be understood that, the training files may be labeled with security categories using other approaches, which are not limited in the present application.

Next, at step 403, one or more entropy vectors of the above mentioned training files are determined.

Finally, at step 404, it trains and outputs a detection model based on the entropy vectors and the security category labels of the training files mentioned above.

In one embodiment, an initial inspection model according to the entropy vectors and the security categories of the above mentioned training files may be obtained first. In particular, a subset of the training files is defined as first files. A feature classification is performed to the first files' entropy vectors. The feature classification of the first files' entropy vectors may use a Support Vector Machine (SVM) algorithm. It will be understood that the feature classification to the first files' entropy vectors may use other means, which are not limited in the present application. Subsequently, the initial inspection model is obtained by a learning operation based on the outcome of the feature classification and the security category labels of the first files.

Next, it is determined whether a misjudgment rate of the initial inspection model is below a predetermined threshold value. In particular, files other than the first files are obtained from the training files as second files (i.e., the second files exclude the first files) and the entropy vectors of the second files are inspected by using the initial inspection model (i.e., the inspection model to be tested) to determine the security category of each of the second files. If the determination result obtained from the initial inspection model matches the security category label in a selected second file, the determination result is correct, and vice versa. The misjudgment rate caused by the initial inspection model is acquired by dividing the misjudgment occurrences by the total number of tests. Then, the misjudgment rate is compared with the predetermined threshold value to determine whether the misjudgment rate is below the predetermined threshold value.

If the misjudgment rate of the initial inspection model is above the predetermined threshold value, the accuracy of the present model is not sufficient. Consequently, a step of correcting the present inspection model and a step of determining whether the misjudgment rate of the corrected inspection model is below the predetermined threshold value will be sequentially repeated. In particular, the step of correcting the present inspection model includes at least one of the following: increasing the number of the first files; obtaining the inspection model by a further learning operation; adjusting the dimension of the entropy vectors; and obtaining the inspection model by a further learning operation.

At last, if the misjudgment rate of the corrected inspection model is below the predetermined threshold value, meaning that the accuracy of the inspection model is satisfied, the cycling of the steps stops, and the corrected inspection model is exported.

It should be noted that, although the operations of the method according to the present invention are described in a given sequence as shown in the figures, it does not require or imply that these operations be necessarily performed according to the given sequence, or the expected result can only be achieved by performing all operations as described. On the contrary, the steps illustrated in the flow chart may be performed in other sequences. For example, in the flow chart 400 of FIG. 4, step 403 may be performed prior to step 402 to determine the entropy vectors of the training files, and then step 402 may be performed to label the training files with security categories according to the corresponding security categories. Additionally or alternatively, some steps may be omitted, or combined as one step, or a particular step may be divided into several steps.

Figure 5:
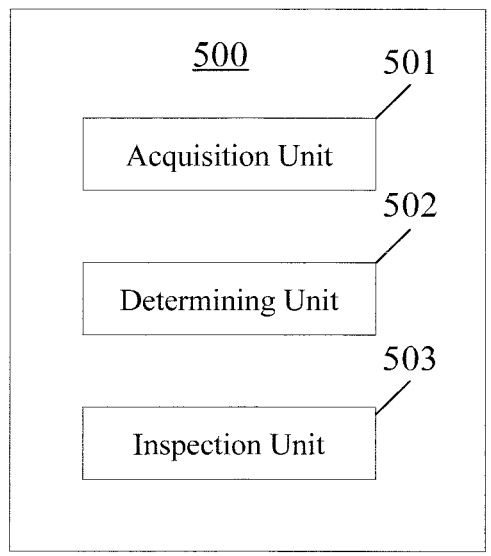
FIG. 5 is a structural schematic diagram illustrating an apparatus for detecting a malware file according to an embodiment of the present application.

Further referring to FIG. 5, there is shown a structural schematic diagram of an apparatus for detecting a malware file according to one embodiment of the present application.

As shown in FIG. 5, the apparatus 500 of this embodiment comprises: an acquisition unit 501 acquiring a file to be inspected, a determining unit 502 determining the entropy vector of the file, and an inspection unit 503 inspecting the determined entropy vector of the file by using a trained inspection model, to ascertain if the file is a malware file, wherein the file type of the file is identical to a model file type corresponding to the inspection model.

In some embodiments, the inspection model is obtained by acquiring a plurality of files with the identical file type and known security categories as training files, wherein the security categories include malware file categories and non-malware file categories; labeling the acquired training files with corresponding security categories; determining the entropy vector of each of the training files; and training and outputting an inspection model based on the determined entropy vectors and the security category labels of the training files.

In some embodiments, the training and outputting the inspection model includes: obtaining an initial inspection model based on the entropy vectors and the security category labels of the training files; determining whether the misjudgment rate of the initial inspection model is below a predetermined threshold value. If not, the step of correcting the present inspection model and the step of determining if the misjudgment rate of the corrected inspection model is below the predetermined threshold value are sequentially repeated; and stopping the repeating, and outputting the corrected inspection model when the misjudgment rate of the corrected inspection model is below the predetermined threshold value.

In some embodiments, the obtaining the initial inspection model includes: obtaining a subset of files from the training files as first files; performing a feature classification to the first files' entropy vectors; obtaining the initial inspection model by learning the result and the security category labels of the first files.

In some embodiments, the determining if the misjudgment rate of the inspection model is below the predetermined threshold value includes: obtaining a subset of files from the training files as second files; inspecting the entropy vectors of the second files using the inspection model; determining the misjudgment rate based on the inspected entropy vectors and the security category labels of the second files; and comparing the misjudgment rate with the predetermined threshold value to determine if the misjudgment rate is below the predetermined threshold value, wherein the second files and the first files are mutually exclusive.

In some embodiments, the correcting the present inspection model includes at least one of the following: increasing the number of the first files and obtaining the inspection model by a further learning operation; and adjusting the dimension of the entropy vectors and obtaining the inspection model by a further learning operation.

In some embodiments, the determining unit is configured to: divide a file into a predetermined number of segments; obtain the entropy value of each of the segments; and set the number of the segments as the dimension of the entropy vectors, wherein each of the segments corresponds to one direction of the entropy vector, and the entropy vector of the file is determined based on the entropy value of each segment.

It should be understood that each unit or module in the apparatus 500 corresponds to the respective step of the method described with reference to FIGS. 1-4. Accordingly, the operations and features described in the above mentioned methods are suitable for the apparatus 500 and the units thereof, and the detailed description therefor is not repeated here. The apparatus 500 may be provided in a terminal in advance or loaded to the terminal by downloading or other means. The corresponding units in the apparatus 500 may cooperate with the units in the terminal to implement the solution.

Figure 6:
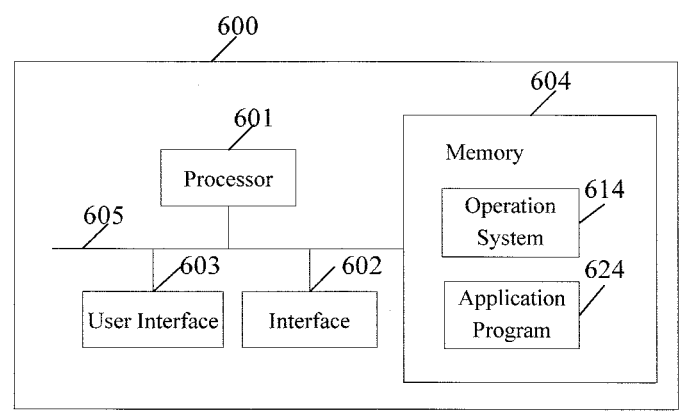
FIG. 6 is a structural schematic diagram illustrating a terminal according to an embodiment of the present application.

Further referring to FIG. 6, there is shown a structural schematic diagram of a terminal according to one embodiment of the present application.

As shown in FIG. 6, the terminal 600 of this embodiment includes: at least one processor 601, for example a central processing unit (CPU); at least one communication interface 602; at least one user interface 603; a memory 604; and a communication bus 605. The communication bus 605 is configured for the connections and communications among the above-mentioned components. The terminal 600 may optionally include a user interface 603, for example a display component, a keyboard or a pointing device (for example, a mouse, a track ball, a touchpad, or a touch screen), and the like. The memory 604 may comprise a high-speed random access memory (RAM), or a non-volatile memory, such as a magnetic disc memory. The memory 604 may optionally include a storage device located remotely from the above-mentioned processor 601.

In some embodiments, the memory 604 stores executable modules or data structures, or the subset or extended set thereof, such as:

an operation system 614 comprising various system programs for implementing various basic services and handling hardware interfacing tasks; and an application program 624 comprising various application programs for implementing various application services including the methods described above with regards to FIGS. 1-5.

In one embodiment, the memory 604 is configured to store the trained inspection model, and the processor 601 is configured to acquire the file to be inspected, determine the entropy vector of the file, and detect the entropy vector of the file by using the trained inspection model to ascertain if the file is a malware file, wherein the file type of the file is identical to a model file type corresponding to the inspection model.

Furthermore, the inspection model is obtained by: acquiring a plurality of files with the identical file types and known security categories as training files, the security categories comprising malware file categories and non-malware file categories; labeling the acquired training files with corresponding security categories; determining the entropy vector of each of the training files; and training and outputting an inspection model based on the determined entropy vectors and the security category labels of the training files.

The units and modules described in the embodiments of the present invention may be implemented by using certain software or hardware. The described units and modules may also be provided in the processor. For example, it may be described as "a processor comprising an acquisition unit, a determining unit and an inspection unit". The names of these units and modules in particular situation are not intended to introduce any limitations to the units and modules themselves. For example, the acquisition unit may also be described as "a unit for acquiring the file to be inspected".

In addition, there is provided a computer readable storage media, which may be a computer readable storage media included in the apparatus as disclosed in the above embodiments, or a computer readable storage media existing independently rather than embedded in any terminal. The computer readable storage media stores one or more computer programs, the computer programs executed by one or more processors to perform the method for inspecting a malware file as discussed in the present application.

The above description only refers to the preferred embodiments of the present application and explains the applicable technical principles. It will be appreciated by those skilled in the art that the scope of the claimed solutions as disclosed in the present application are not limited to those consisted of particular combinations of features described above, but should cover other solutions formed by any combination of features from the foregoing or an equivalent thereof without departing from the inventive concepts, for example, a solution formed by replacing one or more features as discussed in the above with one or more features with similar functions disclosed (but not limited to) in the present application.

What is claimed is:

1. A method for detecting a malware file, comprising:
acquiring a file to be inspected;
determining an information entropy vector of the file by
dividing the file into a predetermined number of segments;
obtaining an information entropy value for each of the segments; and
setting the number of the segments as a dimension of the information entropy vector, wherein each of the segments corresponds to one direction of the information entropy vector, and the information entropy vector of the file is determined based on the information entropy value of each of the segments; and
inspecting, using a trained inspection model, the determined information entropy vector of the file to ascertain whether the file is a malware file, wherein a file type of the file is identical to a model file type corresponding to the inspection model,
wherein the inspection model is obtained by:
acquiring a plurality of files with an identical file type and known security categories as training files, wherein the security categories include malware file categories and non-malware file categories;
labeling the acquired training files with security category labels according to the known security categories;
determining the information entropy vectors of the training files; and
training and outputting the inspection model based on the determined information entropy vectors and the security category labels of the training files,
the training and outputting the inspection model comprises:
obtaining a subset of files from the training files as first files;
performing a feature classification to the information entropy vectors of the first files, resulting in a classification outcome; and
obtaining an initial inspection model by a learning operation based on the classification outcome and the security category labels of the first files;
determining if a misjudgment rate of the initial inspection model is below a predetermined threshold value and outputting the initial inspection model as the trained inspection model when the misjudgment rate of the initial inspection model is below a predetermined threshold;

if the misjudgment rate is not below the predetermined threshold value, repeating a step of generating a corrected inspection model by correcting the initial inspection model or a present corrected inspection model until the misjudgment rate of the corrected inspection model is below the predetermined threshold value; and stopping the repeating, and outputting the corrected inspection model as the trained inspection model when the misjudgment rate of the corrected inspection model is below the predetermined threshold value.

2. The method of claim 1, wherein the determining if the misjudgment rate of the inspection model is below the predetermined threshold value comprises:

obtaining a second subset of files from the training files as second files;

inspecting information entropy vectors of the second files using the inspection model to be tested;

determining the misjudgment rate based on the inspected information entropy vectors and the security category labels of the second files; and comparing the determined misjudgment rate with the predetermined threshold value to determine if the misjudgment rate is below the predetermined threshold value, wherein the second files and the first files are mutually exclusive.

3. The method of claim 2, wherein the correcting the initial inspection model or a present corrected inspection model comprises at least one of:

increasing a number of the first files and obtaining the corrected inspection model by a further learning operation; and adjusting a dimension of the information entropy vectors and obtaining the corrected inspection model by a further learning operation.

4. An apparatus for detecting a malware file, the apparatus comprising:

a processor;

a memory storing computer-readable instructions;

wherein, when the computer-readable instructions are executed by the processor, the processor is operable configured to:

acquire a file to be inspected;

determine an information entropy vector of the file divide the file into a predetermined number of segments;

obtain an information entropy value for each of the segments; and set the number of the segments as a dimension of an information entropy vector of the file, wherein each of the segments corresponds to one direction of the information entropy vector, and the information entropy vector of the file is determined based on the information entropy value of each of the segments; and inspect, using a trained inspection model, the determined information entropy vector of the file to ascertain whether the file is a malware file, wherein a file type of the file is identical to a model file type corresponding to the inspection model, wherein the inspection model is obtained by:

acquiring a plurality of files with an identical file type and known security categories as training files, wherein the security categories comprise malware file categories and non-malware file categories;

labeling the acquired training files with security category labels according to the known security categories;

determining the information entropy vectors of the training files; and training and outputting the inspection model based on the determined information entropy vectors and the security category labels of the training files, the training and outputting the inspection model comprises:

obtaining a subset of files from the training files as first files;

performing a feature classification to the information entropy vectors of the first files, resulting in a classification outcome; and obtaining an initial inspection model by a learning operation based on the classification outcome and the security category labels of the first files;

determining if a misjudgment rate of the initial inspection model is below a predetermined threshold value and outputting the initial inspection model as the trained inspection model when the misjudgment rate of the initial inspection model is below a predetermined threshold;

if the misjudgment rate is not below the predetermined threshold value, repeating a step of generating a corrected inspection model by correcting the initial inspection model or a present corrected inspection model until the misjudgment rate of the corrected inspection model is below the predetermined threshold value; and stopping the repeating, and outputting the corrected inspection model as the trained inspection model when the misjudgment rate of the corrected inspection model is below the predetermined threshold value.

5. A non-transitory computer storage medium storing computer-readable instructions, wherein, when the computer-readable instructions are executed by a processor, the processor is operable configured to:

obtain a file to be inspected, determine an information entropy vector of the file; and inspect, using a trained inspection model, the determined information entropy vector of the file to ascertain whether the file is a malware file, wherein a file type of the file is identical to a model file type corresponding to the inspection model;

where, in order to determine the information entropy vector of the file, the processor is configured to:

divide the file into a predetermined number of segments;

obtain an information entropy value for each of the segments; and set the number of the segments as a dimension of the information entropy vector, wherein each of the segments corresponds to one direction of the information entropy vector, and the information entropy vector of the file is determined based on the information entropy value of each of the segments, wherein the inspection model is obtained by:

acquiring a plurality of files with an identical file type and known security categories as training files, wherein the security categories include malware file categories and non-malware file categories;

labeling the acquired training files with security category labels according to the known security categories;

determining the information entropy vectors of the training files; and training and outputting the inspection model based on the determined information entropy vectors and the security category labels of the training files, the training and outputting the inspection model comprises:

obtaining a subset of files from the training files as first files;

performing a feature classification to the information entropy vectors of the first files, resulting in a classification outcome; and obtaining an initial inspection model by a learning operation based on the classification outcome and the security category labels of the first files;

determining if a misjudgment rate of the initial inspection model is below a predetermined threshold value and outputting the initial inspection model as the trained inspection model when the misjudgment rate of the initial inspection model is below a predetermined threshold;

if the misjudgment rate is not below the predetermined threshold value, repeating a step of generating a corrected inspection model by correcting the initial inspection model or a present corrected inspection model until the misjudgment rate of the corrected inspection model is below the predetermined threshold value; and stopping the repeating, and outputting the corrected inspection model as the trained inspection model when the misjudgment rate of the corrected inspection model is below the predetermined threshold value.

* * * * *